(12) United States Patent
Li et al.

(10) Patent No.: US 8,817,404 B1
(45) Date of Patent: Aug. 26, 2014

(54) SYSTEMS AND METHODS FOR DATA PROCESSING CONTROL

(71) Applicant: LSI Corporation, San Jose, CA (US)

(72) Inventors: Shu Li, San Jose, CA (US); Jun Xiao, Fremont, CA (US); Fan Zhang, Milpitas, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/945,787

(22) Filed: Jul. 18, 2013

(51) Int. Cl.
G11B 5/09 (2006.01)

(52) U.S. Cl.
USPC ................................. 360/51; 360/32

(58) Field of Classification Search
None
See application file for complete search history.

(56) References Cited

U.S. PATENT DOCUMENTS

| | | | |
|---|---|---|---|
| 4,553,221 A | 11/1985 | Hyatt | |
| 4,805,174 A | 2/1989 | Kubota | |
| 5,278,703 A | 1/1994 | Rub et al. | |
| 5,278,846 A | 1/1994 | Okayama | |
| 5,317,472 A | 5/1994 | Schweitzer, III | |
| 5,325,402 A | 6/1994 | Ushirokawa | |
| 5,351,274 A | 9/1994 | Chennakeshu | |
| 5,392,299 A | 2/1995 | Rhines | |
| 5,406,593 A | 4/1995 | Chennakeshu | |
| 5,417,500 A | 5/1995 | Martinie | |
| 5,450,253 A | 9/1995 | Seki | |
| 5,513,192 A | 4/1996 | Janku | |
| 5,523,903 A | 6/1996 | Hetzler | |
| 5,550,810 A | 8/1996 | Monogioudis et al. | |
| 5,550,870 A | 8/1996 | Blaker | |
| 5,612,964 A | 3/1997 | Haraszti | |
| 5,696,504 A | 12/1997 | Oliveros | |
| 5,710,784 A | 1/1998 | Kindred | |
| 5,717,706 A | 2/1998 | Ikeda | |
| 5,719,871 A | 2/1998 | Helm | |
| 5,802,118 A | 9/1998 | Bliss | |
| 5,844,945 A | 12/1998 | Nam | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |
| 6,005,897 A | 12/1999 | Mccallister | |
| 6,023,783 A | 2/2000 | Divsalar | |
| 6,029,264 A | 2/2000 | Kobayashi | |
| 6,065,149 A | 5/2000 | Yamanaka | |
| 6,097,764 A | 8/2000 | Mccallister | |
| 6,145,110 A | 11/2000 | Khayrallah | |
| 6,175,588 B1 | 1/2001 | Visotsky | |
| 6,216,249 B1 | 4/2001 | Bliss | |
| 6,216,251 B1 | 4/2001 | McGinn | |
| 6,266,795 B1 | 7/2001 | Wei | |
| 6,317,472 B1 | 11/2001 | Choi | |
| 6,351,832 B1 | 2/2002 | Wei | |
| 6,377,610 B1 | 4/2002 | Hagenauer | |
| 6,381,726 B1 | 4/2002 | Weng | |

(Continued)

FOREIGN PATENT DOCUMENTS

WO WO 2010/126482 A1 11/2010

OTHER PUBLICATIONS

U.S. Appl. No. 13/426,714, filed Mar. 22, 2012, Shaohua Yang.

(Continued)

*Primary Examiner* — Paul Huber
(74) *Attorney, Agent, or Firm* — Hamilton DeSanctis & Cha

(57) ABSTRACT

The present inventions are related to systems and methods for data processing, and more particularly to systems and methods for improving performance and/or resource utilization based upon channel characteristics.

20 Claims, 6 Drawing Sheets

(56) References Cited

U.S. PATENT DOCUMENTS

| | | |
|---|---|---|
| 6,393,074 B1 | 5/2002 | Mandyam |
| 6,412,088 B1 | 6/2002 | Patapoutian et al. |
| 6,473,878 B1 | 10/2002 | Wei |
| 6,535,553 B1 | 3/2003 | Limberg et al. |
| 6,625,775 B1 | 9/2003 | Kim |
| 6,697,441 B1 | 2/2004 | Bottomley |
| 6,748,034 B2 | 6/2004 | Hattori |
| 6,757,862 B1 | 6/2004 | Marianetti, II |
| 6,785,863 B2 | 8/2004 | Blankenship |
| 6,807,238 B1 | 10/2004 | Rhee |
| 6,810,502 B2 | 10/2004 | Eidson |
| 6,839,774 B1 | 1/2005 | Ahn |
| 6,970,511 B1 | 11/2005 | Barnette |
| 6,975,692 B2 | 12/2005 | Razzell |
| 6,986,098 B2 | 1/2006 | Poeppelman |
| 7,035,327 B2 | 4/2006 | Nakajima |
| 7,047,474 B2 | 5/2006 | Rhee |
| 7,058,853 B1 | 6/2006 | Kavanappillil et al. |
| 7,058,873 B2 | 6/2006 | Song |
| 7,073,118 B2 | 7/2006 | Greenberg |
| 7,093,179 B2 | 8/2006 | Shea |
| 7,117,427 B2 | 10/2006 | Ophir |
| 7,133,228 B2 | 11/2006 | Fung |
| 7,136,244 B1 | 11/2006 | Rothberg |
| 7,184,486 B1 | 2/2007 | Wu |
| 7,191,378 B2 | 3/2007 | Eroz |
| 7,203,887 B2 | 4/2007 | Eroz |
| 7,230,550 B1 | 6/2007 | Mittal |
| 7,237,181 B2 | 6/2007 | Richardson |
| 7,308,061 B1 | 12/2007 | Huang |
| 7,310,768 B2 | 12/2007 | Eidson |
| 7,313,750 B1 | 12/2007 | Feng |
| 7,370,258 B2 | 5/2008 | Iancu |
| 7,415,651 B2 | 8/2008 | Argon |
| 7,502,189 B2 | 3/2009 | Sawaguchi |
| 7,523,375 B2 | 4/2009 | Spencer |
| 7,587,657 B2 | 9/2009 | Haratsch |
| 7,590,168 B2 | 9/2009 | Raghavan |
| 7,596,196 B1 | 9/2009 | Liu et al. |
| 7,646,829 B2 | 1/2010 | Ashley |
| 7,702,986 B2 | 4/2010 | Bjerke |
| 7,738,202 B1 | 6/2010 | Zheng |
| 7,752,523 B1 | 7/2010 | Chaichanavong |
| 7,779,325 B2 | 8/2010 | Song |
| 7,802,172 B2 | 9/2010 | Casado |
| 7,952,824 B2 | 5/2011 | Dziak |
| 7,957,251 B2 | 6/2011 | Ratnakar Aravind |
| 7,958,425 B2 | 6/2011 | Chugg |
| 7,996,746 B2 | 8/2011 | Livshitz |
| 8,018,360 B2 | 9/2011 | Nayak |
| 8,020,069 B1 | 9/2011 | Feng |
| 8,020,078 B2 | 9/2011 | Richardson |
| 8,161,361 B1 | 4/2012 | Song et al. |
| 8,201,051 B2 | 6/2012 | Tan |
| 8,225,168 B2 | 7/2012 | Yu et al. |
| 8,237,597 B2 | 8/2012 | Liu |
| 8,255,765 B1 | 8/2012 | Yeo |
| 8,261,171 B2 | 9/2012 | Annampedu |
| 8,291,284 B2 | 10/2012 | Savin |
| 8,291,299 B2 | 10/2012 | Li |
| 8,295,001 B2 | 10/2012 | Liu |
| 8,296,637 B1 | 10/2012 | Varnica |
| 8,370,711 B2 | 2/2013 | Alrod |
| 8,381,069 B1 | 2/2013 | Liu |
| 8,413,032 B1 | 4/2013 | Song |
| 8,429,498 B1 | 4/2013 | Anholt |
| 8,443,267 B2 | 5/2013 | Zhong |
| 8,458,555 B2 | 6/2013 | Gunnam |
| 8,464,142 B2 | 6/2013 | Gunnam |
| 2001/0010089 A1 | 7/2001 | Gueguen |
| 2001/0016114 A1 | 8/2001 | Van Gestel et al. |
| 2002/0021519 A1 | 2/2002 | Rae |
| 2002/0067780 A1 | 6/2002 | Razzell |
| 2002/0168033 A1 | 11/2002 | Suzuki |
| 2003/0031236 A1 | 2/2003 | Dahlman |
| 2003/0123364 A1 | 7/2003 | Nakajima et al. |
| 2003/0138102 A1 | 7/2003 | Kohn et al. |
| 2003/0147168 A1 | 8/2003 | Galbraith et al. |
| 2003/0188252 A1 | 10/2003 | Kim |
| 2004/0042436 A1 | 3/2004 | Terry et al. |
| 2004/0194007 A1 | 9/2004 | Hocevar |
| 2004/0228021 A1 | 11/2004 | Yamazaki |
| 2005/0047514 A1 | 3/2005 | Bolinth |
| 2005/0149842 A1 | 7/2005 | Kyung |
| 2005/0210367 A1 | 9/2005 | Ashikhmin |
| 2005/0243456 A1 | 11/2005 | Mitchell et al. |
| 2006/0002689 A1 | 1/2006 | Yang et al. |
| 2006/0159355 A1 | 7/2006 | Mizuno |
| 2007/0029749 A1 | 2/2007 | Park et al. |
| 2007/0234178 A1 | 10/2007 | Richardson |
| 2008/0037676 A1 | 2/2008 | Kyung et al. |
| 2008/0069373 A1 | 3/2008 | Jiang |
| 2008/0140686 A1 | 6/2008 | Hong |
| 2008/0304558 A1 | 12/2008 | Zhu et al. |
| 2009/0003301 A1 | 1/2009 | Reial |
| 2009/0092174 A1 | 4/2009 | Wang |
| 2009/0106633 A1 | 4/2009 | Fujiwara |
| 2009/0125780 A1 | 5/2009 | Taylor |
| 2009/0132893 A1 | 5/2009 | Miyazaki |
| 2009/0150745 A1 | 6/2009 | Langner et al. |
| 2009/0177852 A1 | 7/2009 | Chen |
| 2009/0185643 A1 | 7/2009 | Fitzpatrick |
| 2009/0273492 A1 | 11/2009 | Yang et al. |
| 2010/0077276 A1 | 3/2010 | Okamura et al. |
| 2010/0088575 A1 | 4/2010 | Sharon et al. |
| 2010/0150252 A1 | 6/2010 | Camp |
| 2010/0172046 A1 | 7/2010 | Liu et al. |
| 2010/0241921 A1 | 9/2010 | Gunnam |
| 2010/0268996 A1 | 10/2010 | Yang |
| 2010/0322048 A1 | 12/2010 | Yang et al. |
| 2010/0325511 A1 | 12/2010 | Oh |
| 2011/0041040 A1 | 2/2011 | Su |
| 2011/0043938 A1 | 2/2011 | Mathew |
| 2011/0167227 A1 | 7/2011 | Yang |
| 2011/0258508 A1 | 10/2011 | Ivkovic |
| 2011/0264987 A1 | 10/2011 | Li |
| 2011/0307760 A1 | 12/2011 | Pisek |
| 2011/0320902 A1 | 12/2011 | Gunnam |
| 2012/0020402 A1 | 1/2012 | Ibing |
| 2012/0038998 A1 | 2/2012 | Mathew |
| 2012/0063023 A1 | 3/2012 | Mathew |
| 2012/0079353 A1 | 3/2012 | Liikanen |
| 2012/0124118 A1 | 5/2012 | Ivkovic |
| 2012/0182643 A1 | 7/2012 | Zhang |
| 2012/0185744 A1 | 7/2012 | Varnica |
| 2012/0207201 A1 | 8/2012 | Xia |
| 2012/0212849 A1 | 8/2012 | Xu |
| 2012/0236428 A1 | 9/2012 | Xia |
| 2012/0262814 A1 | 10/2012 | Li |
| 2012/0265488 A1 | 10/2012 | Sun |
| 2012/0317462 A1 | 12/2012 | Liu et al. |
| 2013/0024740 A1 | 1/2013 | Xia |
| 2013/0031440 A1 | 1/2013 | Sharon |
| 2013/0120169 A1 | 5/2013 | Li |

OTHER PUBLICATIONS

Casado et al., Multiple-rate low-density parity-check codes with constant blocklength, IEEE Transations on communications, Jan. 2009, vol. 57, pp. 75-83.

Hagenauer, J. et al A Viterbi Algorithm with Soft-Decision Outputs and its Applications in Proc. IEEE Globecom, pp. 47. 11-47 Dallas, TX Nov. 1989.

Lin et al "An efficient VLSI Architecture for non binary LDPC decoders"—IEEE Transaction on Circuits and Systems II vol. 57, Issue 1 (Jan. 2010) pp. 51-55.

U.S. Appl. No. 13/227,416, Unpublished (filed Sep. 7, 2011) (Lei Chen).

U.S. Appl. No. 13/295,150, Unpublished (filed Nov. 14, 2011) (Zongwang Li).

U.S. Appl. No. 13/770,008, Unpublished (filed Feb. 19, 2013) (Shaohua Yang).

U.S. Appl. No. 13/269,832, Unpublished (filed Oct. 10, 2011) (Haitao Xia).

(56) References Cited

OTHER PUBLICATIONS

U.S. Appl. No. 13/239,683, Unpublished (filed Sep. 22, 2011) (Changyou Xu).
U.S. Appl. No. 13/186,234, Unpublished (filed Jul. 19, 2011) (Haitao Xia).
U.S. Appl. No. 13/213,751, Unpublished (filed Aug. 19, 2011) (Fan Zhang).
U.S. Appl. No. 13/283,549, Unpublished (filed Oct. 27, 2011) (Wu Chang).
U.S. Appl. No. 13/180,495, Unpublished (filed Jul. 11, 2011) (Chung-Li Wang).
U.S. Appl. No. 13/300,078, Unpublished (filed Nov. 18, 2011) (Chung-Li Wang).
U.S. Appl. No. 13/305,510, Unpublished (filed Nov. 28, 2011) (Lei Chen).
U.S. Appl. No. 13/305,551, Unpublished (filed Nov. 28, 2011) (Yang Han).
U.S. Appl. No. 13/296,022, Unpublished (filed Nov. 14, 2011) (Victor Krachkovsky).
U.S. Appl. No. 13/174,537, Unpublished (filed Jun. 30, 2011) (Anantha Raman Krishnan).
U.S. Appl. No. 13/174,453, Unpublished (filed Jun. 30, 2011) (Johnson Yen).
U.S. Appl. No. 13/171,615, Unpublished (filed Jun. 29, 2011) (Bradley D. Seago).
U.S. Appl. No. 13/113,219, Unpublished (filed May 23, 2011) (Yang Han).
U.S. Appl. No. 13/284,730, Unpublished (filed Oct. 28, 2011) (Fan Zhang).
U.S. Appl. No. 13/284,767, Unpublished (filed Oct. 28, 2011) (Fan Zhang).
U.S. Appl. No. 13/302,119, Unpublished (filed Nov. 22, 2011) (Lei Chen).
U.S. Appl. No. 13/621,341, Unpublished (filed Sep. 17, 2012) (Shaohua Yang).
U.S. Appl. No. 13/415,430, Unpublished (filed Mar. 8, 2012) (Nayak Ratnakar Aravind).
U.S. Appl. No. 13/269,852, Unpublished (filed Oct. 10, 2011) (Haitao Xia).
U.S. Appl. No. 13/989,583, Unpublished (filed Oct. 15, 2012) (Shaohua Yang).
U.S. Appl. No. 13/227,544, Unpublished (filed Sep. 8, 2011) (Shaohua Yang).
U.S. Appl. No. 13/483,100, Unpublished (filed May 30, 2012) (Fan Zhang).
U.S. Appl. No. 13/483,105, Unpublished (filed May 30, 2012) (Xuebin Wu).
U.S. Appl. No. 13/426,693, Unpublished (filed Mar. 22, 2012) (Shaohua Yang).
U.S. Appl. No. 13/619,907, Unpublished (filed Sep. 14, 2012) (Fan Zhang).
U.S. Appl. No. 13/652,012, Unpublished (filed Oct. 15, 2012) (Fan Zhang).
U.S. Appl. No. 13/415,326, Unpublished (filed Mar. 8, 2012) (Shaohua Yang).
U.S. Appl. No. 13/746,301, Unpublished (filed Jan. 21, 2013) (Shu Li).
U.S. Appl. No. 13/766,911, Unpublished (filed Feb. 14, 2013) (Shaohua Yang).
U.S. Appl. No. 13/766,891, Unpublished (filed Feb. 14, 2013) (Shu Li).
U.S. Appl. No. 13/875,357, Unpublished (filed May 2, 2013) (Shaohua Yang).
U.S. Appl. No. 13/868,779, Unpublished (filed Apr. 23, 2013) (Fan Zhang).
U.S. Appl. No. 13/853,711, Unpublished (filed Mar. 29, 2013) (Shu Li).
U.S. Appl. No. 13/912,059, Unpublished (filed Jun. 6, 2013) (Fan Zhang).
U.S. Appl. No. 13/918,510, Unpublished (filed Jun. 14, 2013) (Shu Li).
U.S. Appl. No. 13/705,407, Unpublished (filed Dec. 5, 2012) (Lingyan Sun).
U.S. Appl. No. 13/445,848, Unpublished (filed Apr. 12, 2012) (Bruce Wilson).
U.S. Appl. No. 13/426,714, Unpublished (filed Mar. 22, 2012) (Shaohua Yang).
U.S. Appl. No. 13/372,580, Unpublished (filed Feb. 14, 2012) (Fan Zhang).
U.S. Appl. No. 13/422,986, Unpublished (filed Mar. 16, 2012) (Fan Zhang).
U.S. Appl. No. 13/362,409, Unpublished (filed Jan. 31, 2012) (Fan Zhang).
U.S. Appl. No. 13/316,858, Unpublished (filed Dec. 12, 2011) (Zongwang Li).
U.S. Appl. No. 13/597,001, Unpublished (filed Aug. 28, 2012) (Fan Zhang).
U.S. Appl. No. 13/316,741, Unpublished (filed Dec. 12, 2011) (Yang Han).
U.S. Appl. No. 13/445,878, Unpublished (filed Apr. 12, 2012) (Yu Liao).
U.S. Appl. No. 13/412,520, Unpublished (filed Mar. 5, 2012) (Fan Zhang).
U.S. Appl. No. 13/340,974, Unpublished (filed Dec. 30, 2011) (Dan Liu).
U.S. Appl. No. 13/340,951, Unpublished (filed Dec. 30, 2011) (Lei Chen).
U.S. Appl. No. 13/474,660, Unpublished (filed May 17, 2012) (Zongwang Li).
U.S. Appl. No. 13/433,693, Unpublished (filed Mar. 29, 2012) (Fan Zhang).
U.S. Appl. No. 13/545,833, Unpublished (filed Jul. 10, 2012) (Zhi Bin Li).
U.S. Appl. No. 13/596,819, Unpublished (filed Aug. 28, 2012) (Shaohua Yang).
U.S. Appl. No. 13/369,468, Unpublished (filed Feb. 9, 2012) (Zongwang Li).
U.S. Appl. No. 13/596,947, Unpublished (filed Aug. 28, 2012) (Fan Zhang).
U.S. Appl. No. 13/596,978, Unpublished (filed Aug. 28, 2012) (Fan Zhang).
U.S. Appl. No. 13/327,279, Unpublished (filed Dec. 15, 2011) (Wei Feng).

SYSTEMS AND METHODS FOR DATA PROCESSING CONTROL

FIELD OF THE INVENTION

The present inventions are related to systems and methods for data processing, and more particularly to systems and methods for improving performance and/or resource utilization based upon channel characteristics.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. In some cases, the channels over which data is transferred exhibits characteristics that are not addressed adequately by the data processing system. Such a mismatch results in improper resource utilization and/or power utilization.

Hence, for at least the aforementioned reasons, there exists a need in the art for advanced systems and methods for data processing.

BRIEF SUMMARY

The present inventions are related to systems and methods for data processing, and more particularly to systems and methods for improving performance and/or resource utilization based upon channel characteristics.

Various embodiments of the present invention provide data processing systems that include: a data detector circuit, a data decoder circuit, and a rate selector circuit. The data detector circuit is operable to: apply a data detection algorithm to a detector input to yield a first detected output; and repeatedly apply the data detection algorithm guided by an available decoded output to yield an updated detected output. The data decoder circuit is operable to repeatedly apply a data decode algorithm to a decoder input during a number of local iterations to yield a decoded output. The decoder input is derived from one of the first detected output or the updated detected output. The rate selector circuit is operable to select an operational rate of the data detector circuit based at least in part on a characteristic of a channel from which the detector input is derived.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
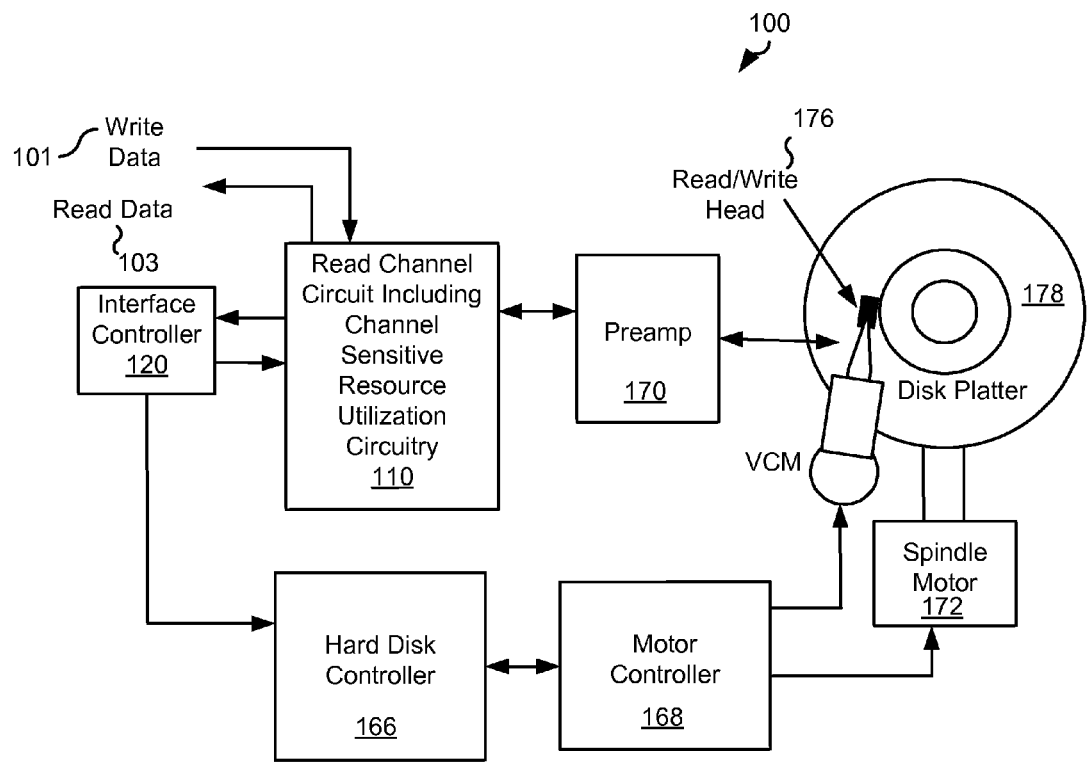
FIG. 1 shows a storage system including a read channel circuit having channel sensitive resource utilization circuitry in accordance with various embodiments of the present invention.

The present inventions are related to systems and methods for data processing, and more particularly to systems and methods for improving performance and/or resource utilization based upon channel characteristics.

In some embodiments of the present invention a data processing system is disclosed that includes a data detector circuit and a data decoder circuit. The data detector circuit is operable to apply a data detection algorithm to a codeword to yield a detected output, and the data decoder circuit is operable to apply a data decode algorithm to a decoder input derived from the detected output to yield a decoded output. Processing a codeword through both the data detector circuit and the data decoder circuit is generally referred to as a "global iteration". During a global iteration, the data decode algorithm may be repeated applied. Each application of the data decode algorithm during a given global iteration is referred to as a "local iteration".

It has been determined that different channel characteristics are better matched to different numbers of local and global iterations. For example, it has been found that where the channel has lower coded bit density, data processing using fewer global iterations and more local iterations than the number of global iterations and local iterations for a channel that has a higher bit density. This performance difference may be because noise is dominated by media defect errors and stand-alone errors for channels exhibiting lower coded bit density. In comparison, noise may be dominated by inter-symbol interference for channels exhibiting higher coded bit density. Some embodiments of the present invention provide an ability to reduce the number of global iterations and/or increases the number of local iterations when a higher coded bit density is identified. In some cases, a reduction in power may be achieved in addition to modifying the number of local iterations and global iterations.

Various embodiments of the present invention provide data processing systems that include: a data detector circuit, a data decoder circuit, and a rate selector circuit. The data detector circuit is operable to: apply a data detection algorithm to a detector input to yield a first detected output; and repeatedly apply the data detection algorithm guided by an available decoded output to yield an updated detected output. The data decoder circuit is operable to repeatedly apply a data decode algorithm to a decoder input during a number of local iterations to yield a decoded output. The decoder input is derived from one of the first detected output or the updated detected output. The rate selector circuit is operable to select an operational rate of the data detector circuit based at least in part on a characteristic of a channel from which the detector input is derived. The data processing system may be implemented as part of, for example, a storage device, or a data transmission device.

The data detector circuit may be, but is not limited to, a Viterbi algorithm data detector circuit, or a maximum a posteriori data detector circuit. In some cases the data decoder circuit is a low density parity check circuit. In such cases, the low density parity check decoder circuit may be a layered low density parity check data decoder circuit, or a non-layered low density parity check data decoder circuit. In some cases, the data processing system is implemented as an integrated circuit.

In some instances of the aforementioned embodiments, the characteristic is a coded bit density. In some such cases, the rate selector circuit selects a standard rate when the coded bit density is a first density and selects a reduced rate when the coded bit density is a second density. In some cases, the first density is less than the second density.

In one or more instances of the aforementioned embodiments, the rate of the data detector circuit is selected to be one or a reduced rate or a standard rate. In some such instances where the reduced rate is selected, the number of local iterations is increased when compared with the number of local iterations allowed when the standard rate is selected. Repeatedly applying the data detection algorithm is limited to a number of global iterations. In such cases, the number of global iterations is decreased when compared with the number of global iterations allowed when the standard rate is selected.

Other embodiments of the present invention provide methods for data processing that include: applying a data detection algorithm to a data input using a data detector circuit to yield a first detected output where the data input is derived from a channel; repeatedly applying a data decode algorithm to a decoder input using a data decoder circuit during a number of local iterations to yield a decoded output, where the decoder input is derived from one of the first detected output or an updated detected output; repeatedly applying the data detection algorithm guided by an available decoded output to yield the updated detected output; determining a channel characteristic for a channel from which data input is derived; and selecting an operational rate of the data detector circuit based at least in part on a characteristic of the channel.

In some instances of the aforementioned embodiments, the characteristic is a coded bit density of the channel. In some such instances, a standard rate is selected as the operational rate when the coded bit density is a first density, and a reduced rate is selected as the operational rate when the coded bit density is a second density.

In various instances of the aforementioned embodiments, the operational rate of the data detector may be, but is not limited to, a reduced rate or a standard rate. In some such instances, when reduced rate is selected, the number of local iterations is increased when compared with the number of local iterations allowed when the standard rate is selected. In various cases, the repeated application of the data detection algorithm is limited to a number of global iterations. In such cases when the reduced rate is selected, the number of global iterations is decreased when compared with the number of global iterations allowed when the standard rate is selected.

Turning to FIG. 1, a storage system 100 including a read channel circuit 110 having channel sensitive resource utilization circuitry in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 utilizes a data detector circuit and a data decoder circuit that are designed to apply a number of global iterations and local iterations up to a maximum number of global iterations and a maximum number of local iterations. Where a low coded bit density is indicated, a first number of global iterations is selected as the maximum number of global iterations, and a second number of local iterations is selected as the maximum number of local iterations. Alternatively, where the low coded bit density is not indicated, a third number of global iterations is selected as the maximum number of global iterations, and a fourth number of local iterations is selected as the maximum number of local iterations. In one particular embodiment of the present invention, the first number is less than the third number and the second number if greater than the fourth number. In some cases, read channel circuit 110 may be implemented to include a data processing circuit similar to that discussed below in relation to FIG. 3, and/or may operate similar to that discussed below in relation to FIGS. 5a-5d.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platted 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
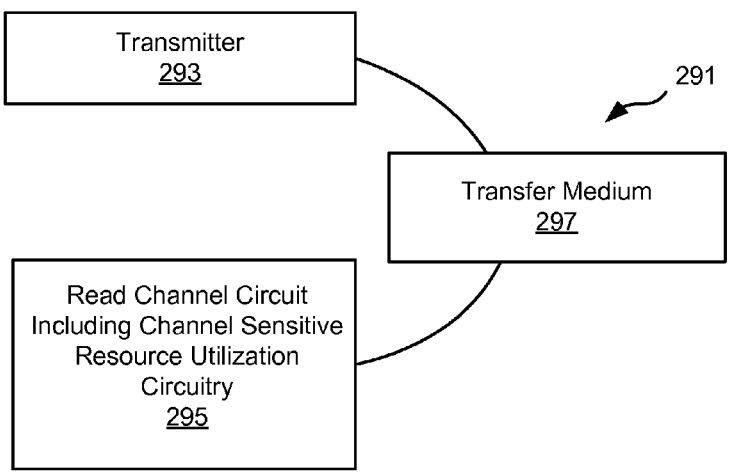
FIG. 2 depicts a data transmission system including a receiver having channel sensitive resource utilization circuitry in accordance with one or more embodiments of the present invention.

Turning to FIG. 2, a data transmission system 291 including a receiver 295 having channel sensitive resource utilization circuitry in accordance with various embodiments of the present invention. Data transmission system 291 includes a transmitter 293 that is operable to transmit encoded information via a transfer medium 297 as is known in the art. The encoded data is received from transfer medium 297 by a receiver 295. Receiver 295 processes the received input to yield the originally transmitted data.

As part of processing the received information, receiver 295 utilizes a data detector circuit and a data decoder circuit that are designed to apply a number of global iterations and local iterations up to a maximum number of global iterations and a maximum number of local iterations. Where a low coded bit density is indicated, a first number of global iterations is selected as the maximum number of global iterations, and a second number of local iterations is selected as the maximum number of local iterations. Alternatively, where the low coded bit density is not indicated, a third number of global iterations is selected as the maximum number of global iterations, and a fourth number of local iterations is selected as the maximum number of local iterations. In one particular embodiment of the present invention, the first number is less than the third number and the second number if greater than the fourth number. In some cases, read channel circuit 110 may be implemented to include a data processing circuit similar to that discussed below in relation to FIG. 3, and/or may operate similar to that discussed below in relation to FIGS. 5a-5d.

Figure 3:
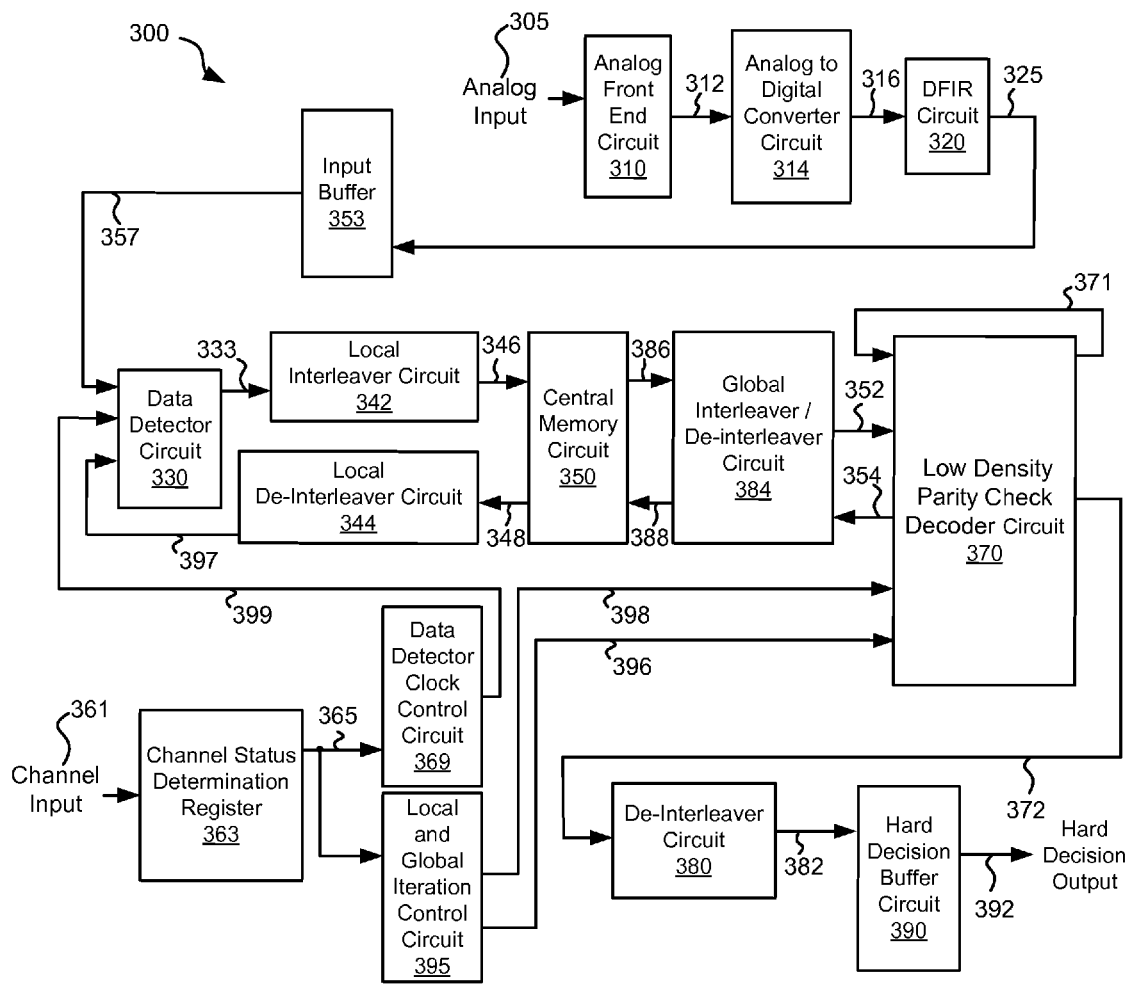
FIG. 3 shows a data processing circuit including having channel sensitive resource utilization circuitry in accordance with some embodiments of the present invention.

Turning to FIG. 3, a data processing circuit 300 including a data decoder circuit 370 including multi-scaling value circuitry is shown in accordance with some embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. It may be possible that equalized output 325 may be received directly from a storage device in, for example, a solid state storage system. In such cases, analog front end circuit 310, analog to digital converter circuit 314 and equalizer circuit 320 may be eliminated where the data is received as a digital data input. Equalized output 325 is stored to an input buffer 353 that includes sufficient memory to maintain a number of codewords until processing of that codeword is completed through a data detector circuit 330 and a low density parity check decoder circuit 370 including, where warranted, multiple global iterations (passes through both data detector circuit 330 and low density parity check decoder circuit 370) and/or local iterations (passes through low density parity check decoder circuit 370 during a given global iteration). An output 357 is provided to data detector circuit 330.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations. Data detector circuit 330 applies the data detection algorithm synchronous to a data detection clock 399 provided from a data detector clock control circuit 369.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detector output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once data decoder circuit 370 is available, a previously stored interleaved codeword 346 is accessed from central memory circuit 350 as a stored codeword 386 and globally interleaved by a global interleaver/de-interleaver circuit 384. Global interleaver/de-interleaver circuit 384 may be any circuit known in the art that is capable of globally rearranging codewords. Global interleaver/De-interleaver circuit 384 provides a decoder input 352 into low density parity check decoder circuit 370. Of note, other types of data decoder circuits may be used in relation to different embodiments of the present invention. In some embodiments of the present invention, the data decode algorithm is a layered low density parity check algorithm as are known in the art. In other embodiments of the present invention, the data decode algorithm is a non-layered low density parity check algorithm as are known in the art. Based upon the disclosure provided herein, one of ordinary skill in the art will recognize a variety of data decode algorithms that may be used in relation to different embodiments of the present invention.

Low density parity check decoder circuit 370 applies the data decode algorithm to decoder input 352 to yield a decoded output 371. In cases where another local iteration (i.e., another pass through low density parity check decoder circuit 370) is desired or allowed, data decoder circuit 370 re-applies the data decode algorithm to decoder input 352 guided by decoded output 371. This continues until either a maximum number of local iterations is exceeded or decoded output 371 converges (i.e., completion of standard processing). The maximum number of local iterations is governed by a maximum local iteration number 398 provided by a local and global iteration control circuit 395.

Where decoded output 371 fails to converge (i.e., fails to yield the originally written data set) and the number of local iterations through low density parity check decoder circuit 370 exceeds a threshold (i.e., maximum local iteration number 398), it is determined whether another global iteration is allowed. In particular, it is determined whether the number of global iterations previously applied to the currently processing data set is less than a maximum global iteration number 396 provided by a local and global iteration control circuit 395. Where the number of global iterations has not been exceeded, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 is accessed from central memory circuit 350 and locally de-interleaved by a de-interleaver circuit 344. De-interleaver circuit 344 rearranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380 that rearranges the data to reverse both the global and local interleaving applied to the data to yield a de-interleaved output 382. De-interleaved output 382 is provided to a hard decision buffer circuit 390 that arranges the received codeword along with other previously received codewords in an order expected by a requesting host processor. The resulting output is provided as a hard decision output 392.

A channel status determination circuit 363 receives a channel input 361. Channel input 361 indicates a coded bit density of a channel from which analog input 305 was derived. In some cases, the channel may be a storage medium or some other type of transfer medium. Where channel input 361 is asserted, a lower coded bit density is indicated. In contrast, where channel input 361 is de-asserted, a higher coded bit density is indicated. In some cases, channel input 361 may be a user programmable value stored in a channel status determination register 363. In other cases, channel input 361 may be automatically generated by sensing the channel. Based upon the disclosure provided herein, one of ordinary skill in the art will recognize a variety of sources of channel input 361. A channel status determination circuit 363 compares channel input 361 to a channel threshold value (not shown).

Channel input 361 is provided as a channel indicator 365 that is provided to data detector clock control circuit 369 and local and global iteration control circuit 395. When channel indicator 365 is asserted indicating a lower coded bit density clock, data detector clock control circuit 369 drives data detection clock 399 as a reduced rate clock, local and global iteration control circuit 395 indicates a reduced number of global iterations via maximum global iteration number 396, and local and global iteration control circuit 395 indicates an increased number of local iterations via maximum local iteration number 398. In contrast, when channel indicator 365 is de-asserted indicating a higher coded bit density clock, data detector clock control circuit 369 drives data detection clock 399 as a full rate clock, local and global iteration control circuit 395 indicates a standard number of global iterations via maximum global iteration number 396, and local and global iteration control circuit 395 indicates a standard number of local iterations via maximum local iteration number 398.

Figure 4A:
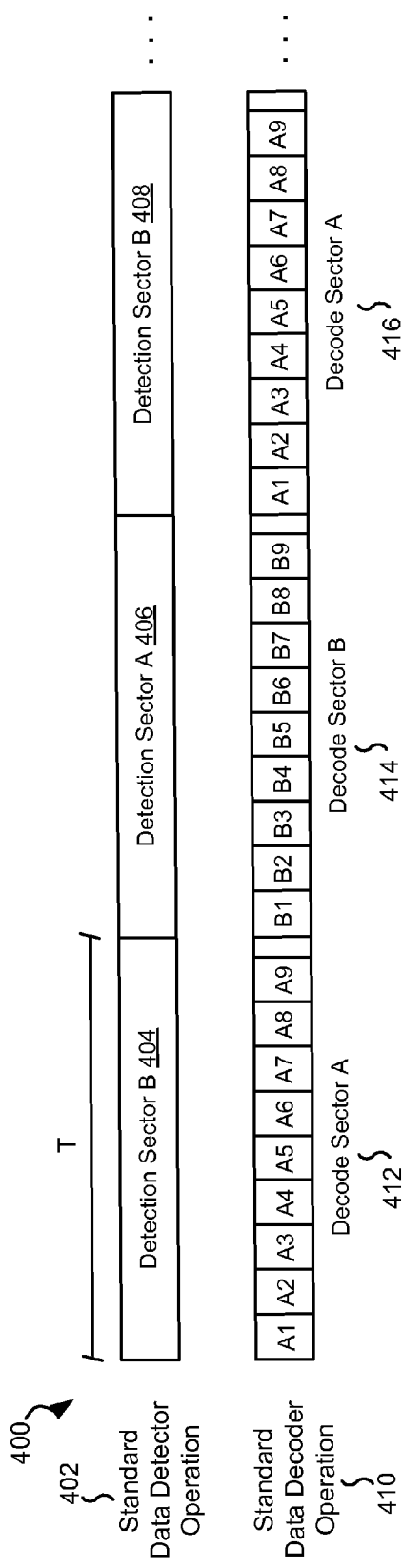
FIGS. 4a-4c are timing diagrams showing different approaches in accordance with various embodiments of the present invention for resource utilization in accordance with some embodiments of the present invention.

Turning to FIG. 4a, a timing diagram 400 shows standard operation of data detector circuit 330 and data decoder circuit 370 that is selected when a channel indicator 365 indicates a higher coded bit density. In particular, operation of data detector circuit 330 is shown as a standard data detector operation 402, and low density parity check decoder circuit 370 as a standard data detector operation 410. As shown, data detector circuit 330 applies the data detection algorithm to a sector B 404 that lasts a period, T. After, during a second global iteration, data detector circuit 330 applies the data detection algorithm to a sector A 406 that lasts the period T. Then, during a second global iteration, data detector circuit 330 applies the data detection algorithm to the sector B 408 that again lasts the period T. During application of the data detection algorithm to sector B 404, data decoder circuit 370 applies a data decode algorithm to sector A 412 for a maximum of nine local iterations (A1-A9). During application of the data detection algorithm to sector A 406, data decoder circuit 370 applies the data decode algorithm to sector B 414 for a maximum of nine local iterations (B1-B9). During application of the data detection algorithm to sector B 408, data decoder circuit 370 applies the data decode algorithm to sector A 416 for a maximum of nine local iterations (A1-A9).

Figure 4B:
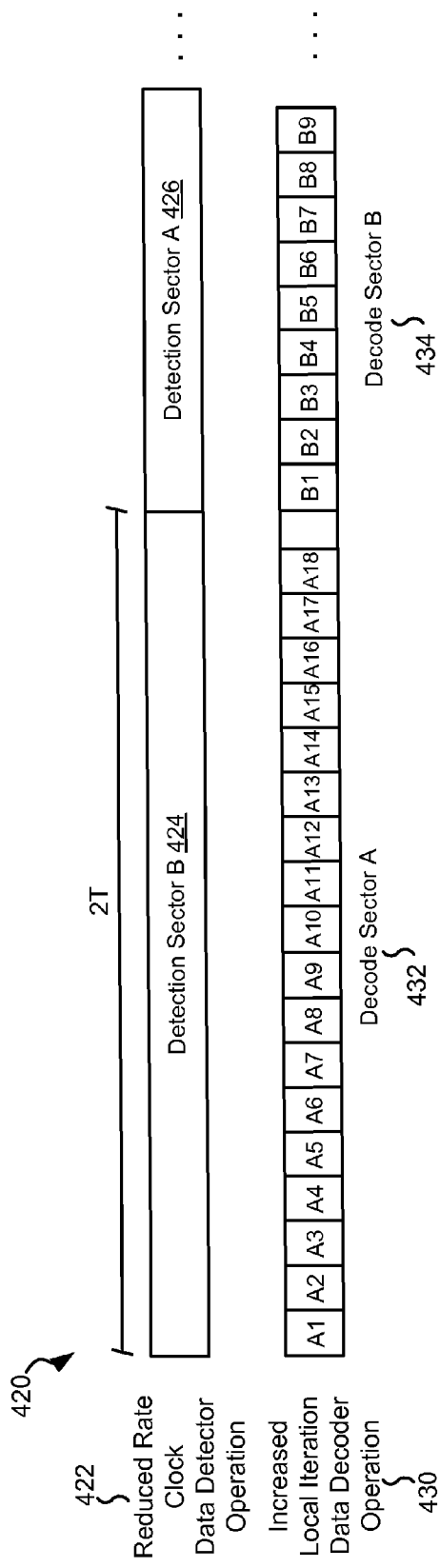

Turning to FIG. 4b, a timing diagram 420 shows nonstandard operation of data detector circuit 330 and data decoder circuit 370 that is selected when a channel indicator 365 indicates a lower coded bit density. In particular, operation of data detector circuit 330 is shown as a reduced rate clock operation 422, and low density parity check decoder circuit 370 as and an increased local iteration operation 430. As shown, data detector circuit 330 applies the data detection algorithm to a sector B 424 that lasts a period, 2T. After, during a second global iteration, data detector circuit 330 applies the data detection algorithm to a sector A 426 that lasts the period 2T (only half the period is shown). The period 2T results from decreasing the period of the clock driving data detector circuit 330 in half. During application of the data detection algorithm to sector B 424, data decoder circuit 370 applies a data decode algorithm to sector A 432 for a maximum of eighteen local iterations (A1-A18). During application of the data detection algorithm to sector A 426, data decoder circuit 370 applies the data decode algorithm to sector B 434 for a maximum of nine local iterations (B1-B18) (only half of the local iterations are shown).

The increased number of local iterations when compared with timing diagram 400 is allowed because the period over which the data detection algorithm is applied (2T) is twice that previously applied in timing diagram 400. In such a situation, the number of allowed global iterations is decreased such that the maximum latency of a codeword being processed remains substantially the same in both timing diagram 400 and timing diagram 420. The increase in local iterations and the decrease in global iterations has been demonstrated to increase the performance of the data processing circuit for codewords derived from a channel with lower coded bit density. In addition, the approach reduces the amount of power expended by the data processing circuit as data detector circuit is operating at half rate over fewer global iterations.

Figure 4C:
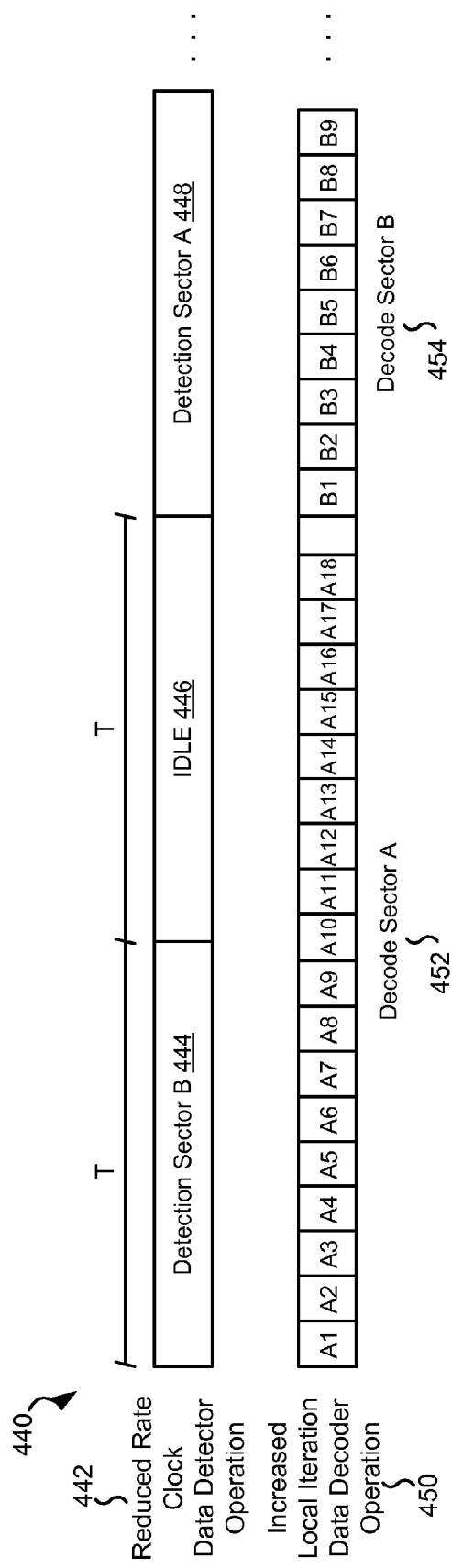

Turning to FIG. 4c, a timing diagram 440 shows nonstandard operation of data detector circuit 330 and data decoder circuit 370 that is selected when a channel indicator 365 indicates a lower coded bit density. In particular, operation of data detector circuit 330 is shown as a reduced rate clock operation 442, and low density parity check decoder circuit 370 as and an increased local iteration operation 450. As shown, data detector circuit 330 applies the data detection algorithm to a sector B 444 that lasts a period T followed by a subsequent period T during which data detector circuit 330 is idle 446. After, during a second global iteration, data detector circuit 330 applies the data detection algorithm to a sector A 448 that lasts the period T. During the period T when the data detection algorithm is being applied, the clock applied to data detector circuit 330 is the same clock as applied during detection in timing diagram 400. During the period T when data detector circuit 330 is idle 446, the clock is gated. During the 2T period when application of the data detection algorithm to sector B 444 and is subsequently idle 446, data decoder circuit 370 applies a data decode algorithm to sector A 452 for a maximum of eighteen local iterations (A1-A18). During application of the data detection algorithm to sector A 4448 and a subsequent idle period (not shown), data decoder circuit 370 applies the data decode algorithm to sector B 454 for a maximum of nine local iterations (B1-B18) (only half of the local iterations are shown).

As with the approach discussed above in relation to FIG. 4b, the increased number of local iterations when compared with timing diagram 400 is allowed because the period over which the data detection algorithm is applied (2T) is twice that previously applied in timing diagram 400. In such a situation, the number of allowed global iterations is decreased such that the maximum latency of a codeword being processed remains substantially the same in both timing diagram 400 and timing diagram 440. The increase in local iterations and the decrease in global iterations has been demonstrated to increase the performance of the data processing circuit for codewords derived from a channel with lower coded bit density. In addition, the approach reduces the amount of power expended by the data processing circuit as data detector circuit is operating half of the time as that discussed above in relation to timing diagram 400.

Figure 5A:
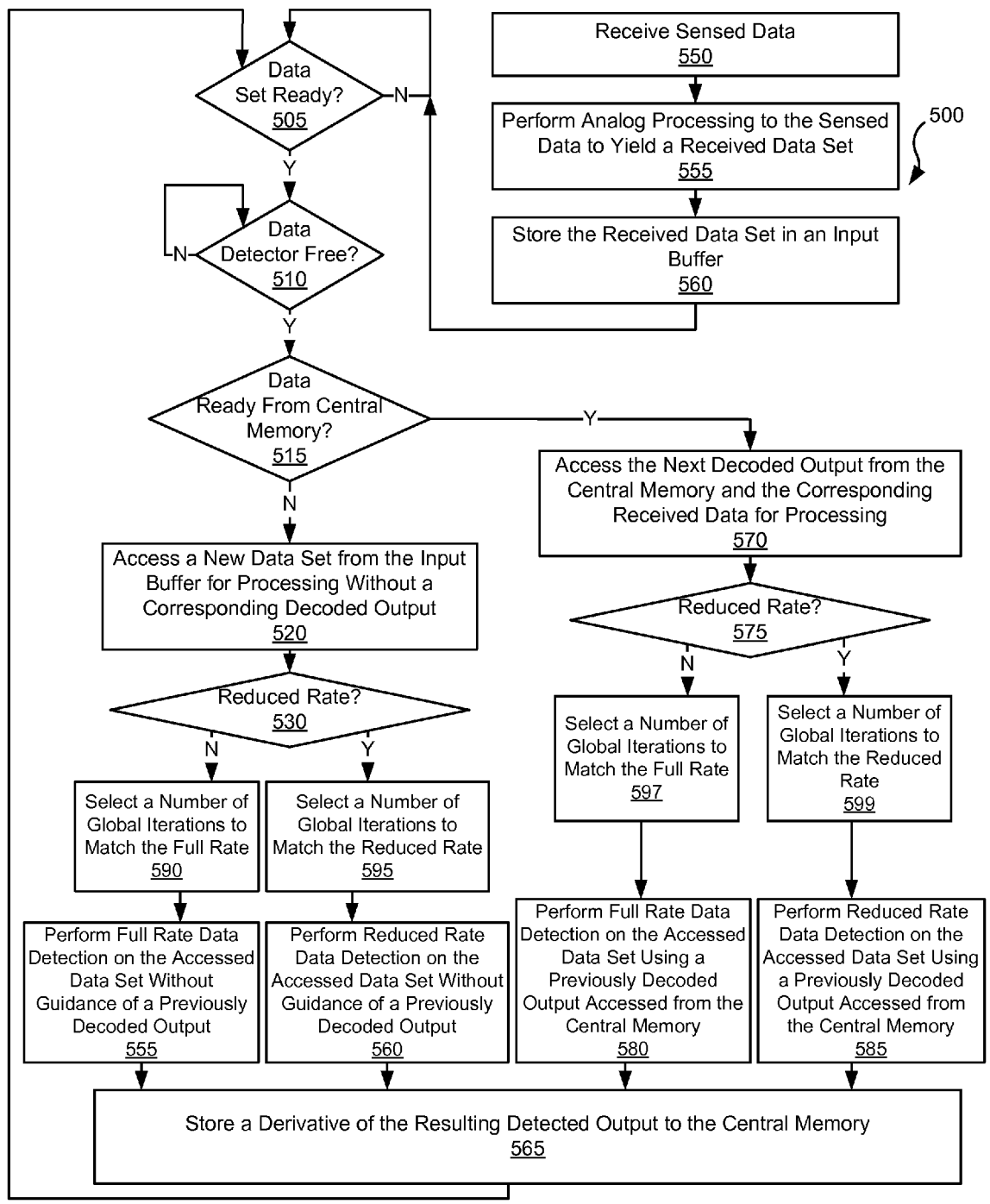
FIGS. 5a-5b are flow diagrams showing a method for performing data processing including resource utilization control in accordance with some embodiments of the present invention.
Figure 5B:
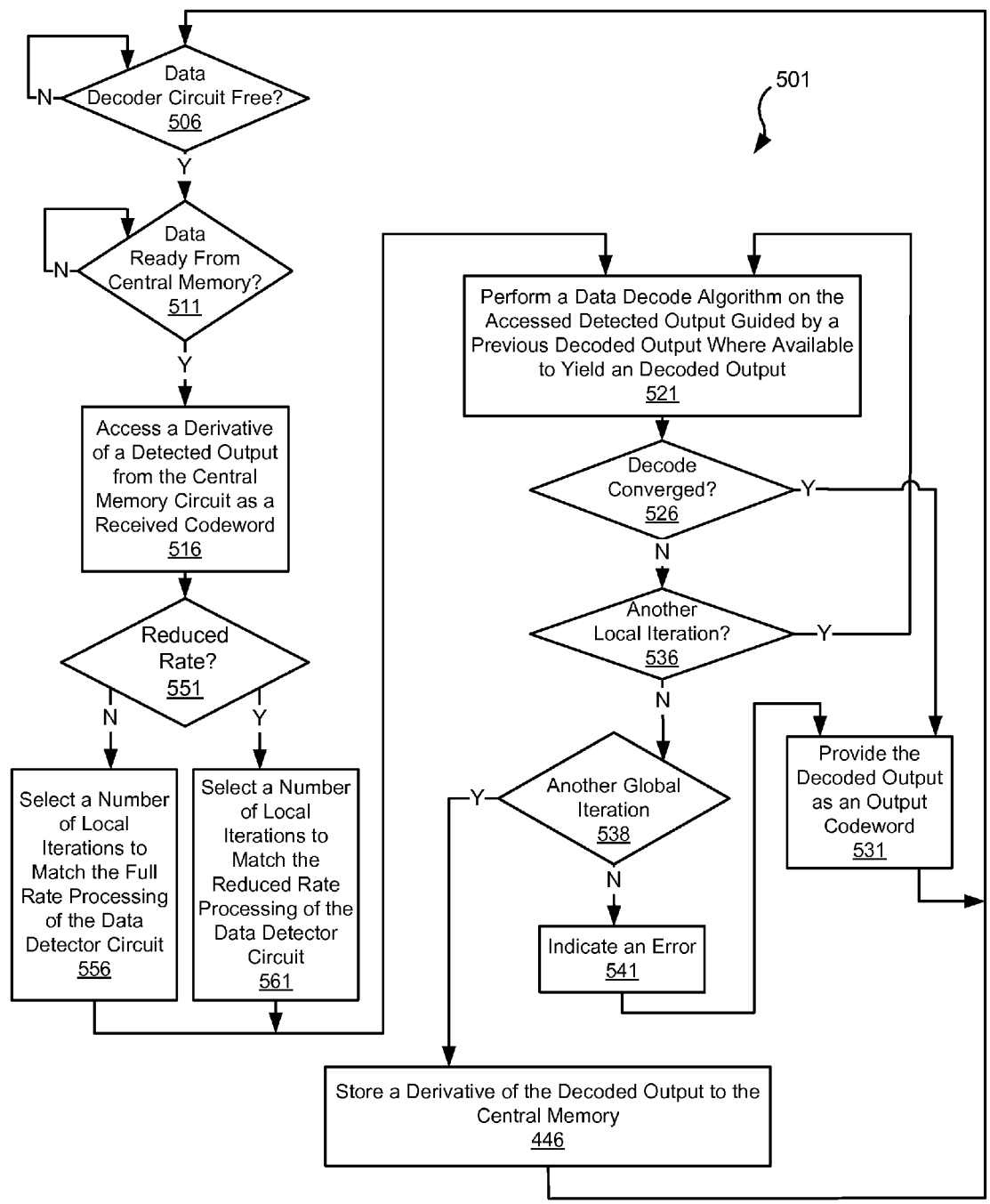

Turning to FIGS. 5a-5b, flow diagrams showing a method for performing data processing including resource utilization control in accordance with some embodiments of the present invention. Following flow diagram 500 of FIG. 5a, sensed data is received (block 550). This data set may be derived or received from, for example, a storage medium or a communication medium. Analog processing is applied to the sensed data to yield a received data set (block 555). This analog processing may include, but is not limited to, amplification, equalization, and/or analog to digital conversion. The resulting received data set is stored to an input buffer (block 560).

It is repeatedly determined whether a data set is ready for processing (block 505). A data set may become ready for processing where either the data set was previously processed and a data decode has completed in relation to the data set and the respective decoded output is available in a central memory, or where a previously unprocessed data set becomes available in the input buffer. Where a data set is ready (block 505), it is determined whether a data detector circuit is available to process the data set (block 510).

Where the data detector circuit is available for processing (block 510), it is determined whether there is a decoded output in the central memory that is ready for additional processing (block 515). Where there is a decoded output available in the central memory (block 515), the next decoded output from the central memory is accessed along with the corresponding received data stored in the input buffer (block 570). It is determined whether the data detection is to be applied at a reduced rate (block 575). The reduced rate data detection is applied when the coded bit density of the channel from which the processing data set is received is a lower coded bit density. In some cases, this indication of a lower coded bit density is a user programmable indicator. In contrast, for higher coded bit density, a reduced rate is not to be applied.

Where a reduced rate is to be applied (block 575), a number of global iterations is selected to match the reduced rate (block 599). As an example, where the reduced rate increases the period during which the data detection is either applied or idle, the number of local iterations is increased to utilize this time that the data decoder circuit would otherwise be idle, and the overall number of global iterations is decreased to render the maximum data processing duration substantially unchanged when compared with full rate processing. In addition, reduced rate data detection is applied to the accessed data set using a previously decoded output accessed from the central memory (block 585). This reduced rate data detection may be, for example, accomplished by reducing the frequency at which the data detector circuit is clocked as shown in FIG. 4b. Alternatively, as another example, the reduced rate data detection may be accomplished by gating the clock used by the data detector circuit for half the time as is shown in FIG. 4c. At this juncture, a derivative of the detected output resulting from performing the data detection is stored to the central memory (block 565).

Alternatively, where a reduced rate is not to be applied (block 575), a number of global iterations is selected to match the full or standard rate (block 597). In addition, full or standard rate data detection is applied to the accessed data set using a previously decoded output accessed from the central memory (block 580). An example of this standard rate data detection is shown in relation to FIG. 4a. At this juncture, a derivative of the detected output resulting from performing the data detection is stored to the central memory (block 565).

When no data is ready from the central memory (block 515), a new data set is accessed from the input buffer for processing without a corresponding decoded output (block 520). It is determined whether the data detection is to be applied at a reduced rate (block 530). Again, the reduced rate data detection is applied when the coded bit density of the channel from which the processing data set is received is a lower coded bit density. In some cases, this indication of a lower coded bit density is a user programmable indicator. In contrast, for higher coded bit density, a reduced rate is not to be applied.

Where a reduced rate is to be applied (block 530), a number of global iterations is selected to match the reduced rate (block 595). As an example, where the reduced rate increases the period during which the data detection is either applied or idle, the number of local iterations is increased to utilize this time that the data decoder circuit would otherwise be idle. In addition, reduced rate data detection is applied to the accessed data set using a previously decoded output accessed from the central memory (block 560). This reduced rate data detection may be, for example, accomplished by reducing the frequency at which the data detector circuit is clocked as shown in FIG. 4b. Alternatively, as another example, the reduced rate data detection may be accomplished by gating the clock used by the data detector circuit for half the time as is shown in FIG. 4c. At this juncture, a derivative of the detected output resulting from performing the data detection is stored to the central memory (block 565).

Alternatively, where a reduced rate is not to be applied (block 530), a number of global iterations is selected to match the full or standard rate (block 590). In addition, full or standard rate data detection is applied to the accessed data set using a previously decoded output accessed from the central memory (block 555). An example of this standard rate data detection is shown in relation to FIG. 4a. At this juncture, a derivative of the detected output resulting from performing the data detection is stored to the central memory (block 565).

Turning to flow diagram 501 of FIG. 5b, a counterpart of the method described above in relation to FIG. 4a is shown. Following flow diagram 501, in parallel to the previously described data detection process of FIG. 5a, it is determined whether a data decoder circuit is available (block 506). The data decoder circuit may be, for example, a low density data decoder circuit as are known in the art. Where the data decoder circuit is available (block 506), it is determined whether a derivative of a detected output is available for processing in the central memory (block 511). Where such a data set is ready (block 511), the previously stored derivative of a detected output is accessed from the central memory and used as a received codeword (block 516).

It is determined whether reduced rate data detection is being applied (block 551). Again, the reduced rate data detection is applied when the coded bit density of the channel from which the processing data set is received is a lower coded bit density. In some cases, this indication of a lower coded bit density is a user programmable indicator. In contrast, for higher coded bit density, a reduced rate is not to be applied.

Where a reduced rate data detection is being applied (block 561), a number of local iterations is selected to match the reduced rate (block 595). As an example, where the reduced rate increases the period during which the data detection is either applied or idle, the number of local iterations is increased to utilize this time that the data decoder circuit would otherwise be idle. Alternatively, where reduced rate data detection is not being applied (block 561), a number of local iterations is selected to match the full rate (block 556). A data decode algorithm is applied to the accessed detected output (block 521). Where a previous local iteration has been performed on the received codeword, the results of the previous local iteration (i.e., a previous decoded output) are used to guide application of the decode algorithm. In some embodiments of the present invention, the decode algorithm is a low density parity check decode algorithm.

It is then determined whether the decoded output converged (i.e., resulted in the originally written data) (block 526). Where the decoded output converged (block 526), it is provided as an output codeword (block 531). Alternatively, where the decoded output failed to converge (block 526), it is determined whether another local iteration is desired (block 536). As discussed above in relation to blocks 556, 561, the maximum number of local iterations is set based upon whether the application of the data detection algorithm (discussed in relation to FIG. 5a) is full rate or reduced rate. In some cases seven local iterations are allowed per each global iteration for full rate data detection, and fourteen local iterations are allowed per each global iteration for reduced rate data detection. Based upon the disclosure provided herein, one of ordinary skill in the art will recognize another number of local iterations that may be used in relation to different embodiments of the present invention. Where another local iteration is desired (block 536), the processes of blocks 521-536 are repeated for the codeword.

Alternatively, where another local iteration is not desired (i.e., the allowable number of local iterations are exceeded) (block 436), it is determined whether another global iteration is allowed for the codeword (block 538). As discussed above in relation to blocks 590, 595, 597, 599 of FIG. 5a, the maximum number of global iterations is set based upon whether the application of the data detection algorithm (discussed in relation to FIG. 5a) is full rate or reduced rate. In some cases eight global iterations are allowed for full rate data detection, and four global iterations are allowed for reduced rate data detection. Based upon the disclosure provided herein, one of ordinary skill in the art will recognize another number of global iterations that may be used in relation to different embodiments of the present invention. Where another global iteration is not allowed (block 538), an error is indicated (block 541) and the current decoded output is provided as an output codeword (block 531). Alternatively, where another global iteration is allowed (block 538), a derivative of the current decoded output is stored to the central memory to await application of a subsequent global iteration (block 546).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/ or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a data detector circuit operable to:
        apply a data detection algorithm to a detector input to yield a first detected output; and
        repeatedly re-apply the data detection algorithm to the data input guided by an available decoded output to yield an updated detected output;
    a data decoder circuit operable to repeatedly apply a data decode algorithm to a decoder input during a number of local iterations to yield a decoded output, wherein the decoder input is derived from one of the first detected output or the updated detected output; and
    a rate selector circuit operable to select an operational rate of the data detector circuit based at least in part on a characteristic of a channel from which the detector input is derived.

2. The data processing system of claim 1, wherein the characteristic is a coded bit density.

3. The data processing system of claim 2, wherein the rate selector circuit selects a standard rate when the coded bit density is a first density and selects a reduced rate when the coded bit density is a second density.

4. The data processing system of claim 1, wherein the operational rate of the data detector circuit is selected from a group consisting of: a reduced rate, and a standard rate.

5. The data processing system of claim 4, wherein when the reduced rate is selected, the number of local iterations is increased when compared with the number of local iterations allowed when the standard rate is selected.

6. The data processing system of claim 4, wherein the repeated application of the data detection algorithm is limited to a number of global iterations.

7. The data processing system of claim 6, wherein when the reduced rate is selected, the number of global iterations is decreased when compared with the number of global iterations allowed when the standard rate is selected.

8. The data processing system of claim 1, wherein the data detector circuit is selected from a group consisting of: a Viterbi algorithm data detector circuit, and a maximum a posteriori data detector circuit.

9. The data processing system of claim 1, wherein the data decoder circuit is a low density parity check circuit.

10. The data processing system of claim 9, wherein the low density parity check decoder circuit is selected from a group consisting of: a layered low density parity check data decoder circuit, and a non-layered low density parity check data decoder circuit.

11. The data processing system of claim 1, wherein the data processing system is implemented as an integrated circuit.

12. The data processing system of claim 1, wherein the data processing system is incorporated in a device selected from a group consisting of: a storage device, and a data transmission device.

13. A method for data processing, the method comprising:
    applying a data detection algorithm to a data input using a data detector circuit to yield a first detected output, wherein the data input is derived from a channel;
    repeatedly applying a data decode algorithm to a decoder input using a data decoder circuit during a number of local iterations to yield a decoded output, wherein the decoder input is derived from one of the first detected output or an updated detected output;

repeatedly re-applying the data detection algorithm guided by an available decoded output to yield the updated detected output;

determining a channel characteristic for a channel from which data input is derived; and selecting an operational rate of the data detector circuit based at least in part on a characteristic of the channel.

14. The method of claim 13, wherein the characteristic is a coded bit density of the channel.

15. The method of claim 14, wherein a standard rate is selected as the operational rate when the coded bit density is a first density, and wherein a reduced rate is selected as the operational rate when the coded bit density is a second density.

16. The method of claim 13, wherein the operational rate of the data detector circuit is selected from a group consisting of: a reduced rate, and a standard rate.

17. The method of claim 16, wherein when the reduced rate is selected, the number of local iterations is increased when compared with the number of local iterations allowed when the standard rate is selected.

18. The method of claim 16, wherein the repeated application of the data detection algorithm is limited to a number of global iterations.

19. The method of claim 18, wherein when the reduced rate is selected, the number of global iterations is decreased when compared with the number of global iterations allowed when the standard rate is selected.

20. A storage device, the storage device comprising:

a storage medium;

a head assembly disposed in relation to the storage medium and operable to provide a sensed signal corresponding to a data set on the storage;

a read channel circuit including:
- an analog front end circuit operable to provide an analog signal corresponding to the sensed signal;
- an analog to digital converter circuit operable to sample the analog signal to yield a series of digital samples;
- an equalizer circuit operable to equalize the digital samples to yield a sample set;
- a data detector circuit operable to:
  - apply a data detection algorithm to the sample set to yield a first detected output; and
  - repeatedly re-apply the data detection algorithm to the sample set guided by an available decoded output to yield an updated detected output;
- a data decoder circuit operable to repeatedly apply a data decode algorithm to a decoder input during a number of local iterations to yield a decoded output, wherein the decoder input is derived from one of the first detected output or the updated detected output; and
- a rate selector circuit operable to select an operational rate of the data detector circuit based at least in part on a characteristic of a channel from which the detector input is derived.

* * * * *